(12) United States Patent
Schmidt

(10) Patent No.: US 9,440,852 B2
(45) Date of Patent: Sep. 13, 2016

(54) METHOD FOR PRODUCING LITHIUM OR SODIUM BIS(FLUOROSULFONYL)IMIDE

(75) Inventor: Grégory Schmidt, Colombes (FR)

(73) Assignee: ARKEMA FRANCE, Colombes (FR)

( * ) Notice: Subject to any disclaimer, the term of this patent is extended or adjusted under 35 U.S.C. 154(b) by 233 days.

(21) Appl. No.: 14/115,909

(22) PCT Filed: Apr. 6, 2012

(86) PCT No.: PCT/FR2012/050763
§ 371 (c)(1),
(2), (4) Date: Nov. 6, 2013

(87) PCT Pub. No.: WO2012/160280
PCT Pub. Date: Nov. 29, 2012

(65) Prior Publication Data
US 2014/0075746 A1      Mar. 20, 2014

(30) Foreign Application Priority Data

May 24, 2011 (FR) ...................................... 11 54490
Mar. 23, 2012 (FR) ...................................... 12 52642

(51) Int. Cl.
| | | |
|---|---|---|
| C01B 21/093 | (2006.01) | |
| C01B 21/086 | (2006.01) | |
| H01M 10/052 | (2010.01) | |
| H01M 10/054 | (2010.01) | |
| H01M 10/0568 | (2010.01) | |
| H01M 10/0525 | (2010.01) | |
| H01M 2/36 | (2006.01) | |

(52) U.S. Cl.
CPC ............ *C01B 21/093* (2013.01); *C01B 21/086* (2013.01); *H01M 2/36* (2013.01); *H01M 10/052* (2013.01); *H01M 10/054* (2013.01); *H01M 10/0525* (2013.01); *H01M 10/0568* (2013.01); *H01M 2300/0025* (2013.01); *Y02E 60/122* (2013.01); *Y02P 70/54* (2015.11); *Y10T 29/49108* (2015.01)

(58) Field of Classification Search
CPC .... C01B 23/093; C01B 23/086; H01M 2/36; H01M 10/0525; H01M 10/0568; H01M 10/054; H01M 10/052; H01M 2300/0025; Y02P 70/54; Y10T 29/49108; Y02E 60/122
See application file for complete search history.

(56) References Cited

U.S. PATENT DOCUMENTS

| | | |
|---|---|---|
| 4,374,818 A | 2/1983 | Rieck |
| 5,916,475 A | 6/1999 | Michot et al. |
| 6,252,111 B1 | 6/2001 | Sakai et al. |
| 7,919,629 B2 | 4/2011 | Michot |
| 8,134,027 B2 | 3/2012 | Okumura et al. |
| 2007/0043231 A1† | 2/2007 | Hammami |
| 2011/0034716 A1 | 2/2011 | Okumura et al. |
| 2012/0014859 A1 | 1/2012 | Honda et al. |
| 2012/0020867 A1 | 1/2012 | Morinaka et al. |
| 2012/0041233 A1 | 2/2012 | Sato et al. |
| 2012/0165571 A1 | 6/2012 | Seki et al. |
| 2013/0068991 A1 | 3/2013 | Sato et al. |
| 2014/0369919 A1 | 12/2014 | Schmidt |

FOREIGN PATENT DOCUMENTS

| | | |
|---|---|---|
| CA | 2 527 802 A1 | 6/2007 |
| CN | 101654229 | 2/2010 |
| EP | 0 050 290 A1 | 4/1982 |

(Continued)

OTHER PUBLICATIONS

Krumm, Burkhard, et al., Synthesis of Poly- and the First Perfluoroalkyl-N(SO$_2$F)$_2$ Derivatives: Improved Methods for the Preparation of XN(SO$_2$F)$_2$ (X = H, Cl) and Single-Crystal Diffraction Studies of HN(SO$_2$Cl)$_2$, HN(SO$_2$F)$_2$, and CF$_3$CH$_2$N(SO$_2$F)$_2$, Inorg. Chem., 1998, vol. 37, pp. 6295-6303, American Chemical Society, USA.
Armarego, W.L.F., et al., Purification of Laboratory Chemicals, 2009, 752 pages (see, specifically, pp. 76-77), Sixth Edition, Elsevier Inc., Oxford, UK.
Honeywell Specialty Chemicals, "Hydrofluoric Acid Properties", Jan. 2002, 26 pages, vol. 1.1, Honeywell, US.
Third Party Submission in U.S. Appl. No. 14/476,106, Feb. 12, 2015, 847 pages.
Third Party Submission in U.S. Appl. No. 14/476,106, Mar. 13, 2015, 22 pages.
Beran et al., "A New Method of the Preparation of Imido-bis-(sulfuric acid) Dihalogenide, (F, Cl), and the Potassium Salt of Imido-bis(sulfuric acid) Difluoride", *Zeitschrift für Anorganische und Allgemeine Chemie*, Jan. 1, 2005, pp. 55-59, vol. 631, No. 1, XP055014688.

(Continued)

*Primary Examiner* — Anthony J Zimmer
(74) *Attorney, Agent, or Firm* — Buchanan Ingersoll & Rooney P.C.

(57) ABSTRACT

The invention relates to a process for the preparation of a bis(sulphonato)imide salt of formula:

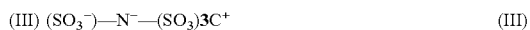

(III) (SO$_3^-$)—N$^-$—(SO$_3$)3C$^+$     (III)

where C$^+$ represents a monovalent cation, comprising the reaction of amidosulphuric acid of formula:

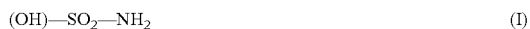

(OH)—SO$_2$—NH$_2$     (I)

with a halosulphonic acid of formula:

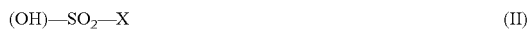

(OH)—SO$_2$—X     (II)

where X represents a halogen atom, and comprising a reaction with a base which is a salt formed with the cation C$^+$.
The invention also relates to a process for the preparation of bis(fluorosulphonyl)imide acid of formula:

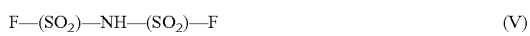

F—(SO$_2$)—NH—(SO$_2$)—F     (V)

and to a process for the preparation of lithium bis(fluorosulphonyl)imide salt of formula:

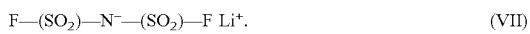

F—(SO$_2$)—N$^-$—(SO$_2$)—F Li$^+$.     (VII)

9 Claims, No Drawings

(56) References Cited

FOREIGN PATENT DOCUMENTS

| | | |
|---|---|---|
| EP | 2 505 551 | 10/2012 |
| EP | 2 578 533 | 4/2013 |
| JP | 2007-182410 A | 7/2007 |
| WO | WO 95/26056 A1 | 9/1995 |
| WO | WO 2007/068822 A2 | 6/2007 |
| WO | WO 2007/068822 A3 | 6/2007 |
| WO | WO 2007/068822 A8 | 6/2007 |
| WO | WO 2009/123328 A1 | 10/2009 |
| WO | 2010010613 A | 1/2010 |
| WO | WO 2010010613 A1 * | 1/2010 ........... C01B 21/086 |
| WO | WO 2010/113483 A1 | 7/2010 |
| WO | WO 2010/113835 A1 | 10/2010 |
| WO | WO 2011/027867 A1 | 3/2011 |
| WO | WO 2011/065502 A1 | 6/2011 |
| WO | WO 2011/149095 A1 | 12/2011 |

OTHER PUBLICATIONS

Parent, Y, "Réactivite chimique de l'ion N(SO$_3$)$_2$$^{3-}$: hydrolyse selon la temperature et l'acidité. Décomposition thermique des imidodisulfates anhydres alcalins", *Bulletin de la Societe Chimique de France, Societe Française de Chimie* Paris, FR, No. 1-2, Part 1, Jan. 1, 1984, pp. I-60-I-64, XP008146453.

Farrugia, L J, et al: "Preparation and X-ray crystal structure of caesium imidodisulphuryl fluoride Cs[N (SO$_2$F)$_2$]", *Journal of Fluorine Chemistry,* May 1, 1996, pp. 51-53, vol. 78, No. 1, Elsevier, NL, XP004020399.

Parent, Y., "Synthèses, stabilité thermique, spectroscopie Raman des imidodisulfates bi et trimétalliques de lithium et de césium. Comparaison avec les autres dérivés alcalins", *Bulletin de la Societe Chimique de France, Societe Française de Chimie,* Paris, FR, No. 7-8, Jan. 1, 1982, pp. I-284-I-288, XP008146569.

Li, Lifei, et al, "Transport and Electrochemical Properties and Spectral Features of Non-Aqueous Electrolytes Containing LiFSI in Linear Carbonate Solvents", *Journal of the Electrochemical Society,* Jan. 1, 2011, pp. A74-A82, vol. 158, No. 2, The Electrochemical Society, XP055014628.

Ruff, John K, et al: "Imidodisulfuryl Fluoride, Cesium Imidodisulfuryl Fluoride, and Fluoroimidodisulfuryl Fluoride", *Inorganic Syntheses,* 1968, pp. 138-143, XP000926426.

Han, Hong-Bo, et al., "Lithium bis (fluorosulfonyl)imide (LiFSI) as conducting salt for nonaqueous liquid electrolytes for lithium-ion batteries: Physicochemical and electrochemical properties," *Journal of Power Sources,,* vol. 196, 2011, pp. 3623-3632, El Sevier B.V., NL.

Third Party Observation in CA Application No. 2,833,821, Aug. 13, 2014, 179 pages.

Third Party Observation in EP Application No. 12 718 707.8/ EP 2 714 588, Oct. 22, 2014, 199 pages.

Third Party Observation in corr. JP Patent Application No. 2014-511928, Nov. 18, 2014, 10 pages.

International Search Report (PCT/ISA/210) mailed on Jan. 4, 2013, by the European Patent Office as the International Searching Authority for International Application No. PCT/FR2012/050763.

Martin Beran et al.; "A new route to the syntheses of alkali metal bis(fluorosulfuryl)imides: Crystal structure of LiN (SO$_2$F)$_2$"; Science Direct; Polyhedron 25; 2006;pp. 1292-1298; National Taiwan University Library.

Han, et al., "Lithium Bis(Fluorosulfonyl)Imide (LiFSI) as Conducting Salt for Nonaqueous Liquid Electrolytes for Lithium-Ion Batteries: Physicochemical and Electrochemical Properties," Journal of Power Sources, 2011, vol. 196, pp. 3623-3632, available online Dec. 21, 2010.†

Taraba et al., "Novel Cation [N(SO2NMe3)2]+ and Its Synthesis and Crystal Structure. Dichloride of Imido-Bis(Sulfuric) Acid HN(SO2Cl)2. Part 1. Crystal Structures of KN(SO2Cl)2.(1/ 2)CH3CN, KN(SO2Cl)2. (1/6)CH2Cl2, and [PCl4][N(SO2Cl)2]," Inorganic Chemistry, 2006, vol. 45, issue 9, pp. 3695-3700.†

* cited by examiner
† cited by third party

METHOD FOR PRODUCING LITHIUM OR SODIUM BIS(FLUOROSULFONYL)IMIDE

FIELD OF THE INVENTION

The present invention relates to a process for the preparation of lithium or sodium bis(fluorosulphonyl)-imide salt, and also to a process for the preparation of intermediate products of use in the preparation of lithium or sodium bis(fluorosulphonyl)imide, and to the use of the lithium or sodium bis(fluorosulphonyl)imide thus obtained in the manufacture of electrolytes and of batteries of lithium-ion or sodium-ion type.

TECHNICAL BACKGROUND

A lithium-ion or sodium-ion battery comprises at least a negative electrode, a positive electrode, a separator and an electrolyte. The electrolyte is composed of a lithium or sodium salt dissolved in a solvent which is generally a mixture of organic carbonates, in order to have a good compromise between the viscosity and the dielectric constant.

The most widely used salts include lithium hexafluorophosphate ($LiPF_6$), which has many of the numerous qualities required but exhibits the disadvantage of decomposing in the form of hydrofluoric acid gas. This presents safety problems, in particular in the context of the impending use of lithium-ion batteries in private vehicles.

Other salts have thus been developed, such as LiTFSI (lithium bis(trifluoromethanesulphonyl)imide) and LiFSI (lithium bis(fluorosulphonyl)imide). These salts exhibit little or no spontaneous decomposition and are more stable with regard to hydrolysis than $LiPF_6$. Nevertheless, LiTFSI exhibits the disadvantage of being corrosive with regard to aluminium current collectors, which is not the case with LiFSI. Thus, LiFSI appears to be a promising alternative to $LiPF_6$.

There exist several known synthetic routes for the manufacture of lithium bis(fluorosulphonyl)imide. One of these routes consists of the reaction of perfluorosulphonic acid with urea: see the document WO 2010/113483 in this regard. The products from this reaction are subsequently dissolved in water and bis(fluorosulphonyl)imide is precipitated in the form of a salt with tetrabutylammonium. However, this synthetic route is not viable on a large scale as the overall yield is very low.

Another route consists in reacting difluorosulphoxide with ammonia: see the document WO 2010/113835 in this regard. However, this method also forms numerous by-products, which requires expensive purification stages.

Furthermore, the document WO 2009/123328 describes generally the manufacture of sulphonylimide compounds. The document describes in particular the reaction between amidosulphuric acid and thionyl chloride, then with chlorosulphonic acid, to form bis(chloro-sulphonyl)imide, which is subsequently subjected to a fluorination stage. However, bis(chlorosulphonyl)imide is an unstable compound which does not tolerate purification. For this reason, the impurities present are retained up to the end of the fluorination stage and render the separation more difficult.

Consequently, there exists a real need to develop a process which makes it possible to obtain LiFSI or NaFSI in a simpler way and/or with a better yield.

SUMMARY OF THE INVENTION

The invention relates first to a process for the preparation of a bis(sulphonato)imide salt of formula:

$$(SO_3^-)-N^--(SO_3)3C^+ \quad \text{(III)}$$

where $C^+$ represents a monovalent cation, comprising the reaction of amidosulphuric acid of formula:

$$(OH)-SO_2-NH_2 \quad \text{(I)}$$

with a halosulphonic acid of formula:

$$(OH)-SO_2-X \quad \text{(II)}$$

where X represents a halogen atom, and comprising a reaction with a base which is a salt formed with the cation $C^+$. In the case where $C^+$ is a proton $H^+$, the base is water.

According to one embodiment, X represents a chlorine atom.

According to one embodiment, $C^+$ represents the proton $H^+$, the potassium ion $K^+$, the sodium ion $Na^+$, the lithium ion $Li^+$ or the caesium ion $Cs^+$, preferably the proton $H^+$, the $Na^+$ ion and the potassium ion K.

According to one embodiment, the process comprises the reaction of amidosulphuric acid of formula (I) with the halosulphonic acid of formula (II), in the presence of a non-nucleophilic base comprising the cation $C^+$, the said non-nucleophilic base preferably being potassium carbonate $K_2CO_3$ or sodium carbonate $Na_2CO_3$.

According to an alternative embodiment, the process comprises the reaction of amidosulphuric acid of formula (I) with the halosulphonic acid of formula (II), in the presence of a first base, to provide the bis(sulphonyl)imide of formula (IV):

$$(OH)-SO_2-NH-SO_2-(OH) \quad \text{(IV)}$$

and then the reaction of the bis(sulphonyl)imide of formula (IV) with a second base, which is a salt formed with the cation $C^+$, in order to obtain the bis(sulphonato)imide salt of formula (III).

According to one embodiment, the first base is triethylamine and the second base is chosen from potassium hydroxide, sodium hydroxide and potassium carbonate.

According to another alternative embodiment, the process comprises the reaction of amidosulphuric acid of formula (I) with the halosulphonic acid of formula (II), in the presence of a chlorinating agent, such as thionyl chloride, in order to provide, after hydrolysis, the bis(sulphonyl)imide of formula (IV).

According to one embodiment, the process comprises a stage of purification of the bis(sulphonato)imide salt of formula (III), preferably by recrystallization from water or from a polar solvent, such as an alcohol.

Another subject-matter of the invention is a process for the preparation of bis(fluorosulphonyl)imide acid of formula:

$$F-(SO_2)-NH-(SO_2)-F \quad \text{(V)}$$

comprising the preparation of a bis(sulphonato)imide salt of formula (III) as described above, followed by the fluorination of the said bis(sulphonato)imide salt.

According to one embodiment, the fluorination of the bis(sulphonato)imide salt comprises the reaction of the bis(sulphonato)imide salt with a fluorinating agent, preferably chosen from hydrogen fluoride, diethylaminosulphur trifluoride and sulphur tetra-fluoride.

According to an alternative embodiment, the fluorination of the bis(sulphonato)imide salt comprises: (a) the chlorination of the bis(sulphonato)imide salt by means of a chlorinating agent, preferably chosen from thionyl chloride, phosphorus pentachloride, phosphorus oxychloride and oxalyl chloride, in order to obtain a bis(chlorosulphonyl) imide salt of formula:

$$Cl-(SO_2)-N^--(SO_2)-Cl\ C^+ \quad (VI)$$

and then (b) the fluorination of the bis(chloro-sulphonyl) imide salt of formula (VI) by means of a fluorinating agent, in order to obtain the bis(fluorosulphonyl)imide acid of formula (V), the fluorinating agent preferably being chosen from hydrogen fluoride, diethylaminosulphur trifluoride, sulphur tetrafluoride and fluoride salts, in particular zinc fluoride.

Another subject-matter of the invention is a process for the preparation of lithium or sodium bis(fluorosulphonyl) imide salt of formula:

$$F-(SO_2)-N^--(SO_2)-F\ Li^+. \quad (VII)$$

with M representing Li or Na, comprising the preparation of bis(fluorosulphonyl)imide acid of formula (V) as described above and then the reaction of this bis(fluorosulphonyl) imide acid with a lithium or sodium base.

A very particular subject-matter of the invention is a process for the preparation of lithium bis(fluorosulphonyl) imide salt of formula (VII).

According to one embodiment, the lithium or sodium base is chosen from lithium hydroxide, sodium hydroxide, lithium carbonate or sodium carbonate.

Another subject-matter of the invention is a process for the manufacture of an electrolyte, comprising the preparation of bis(fluorosulphonyl)imide salt of formula (VII) as described above and the dissolution of the bis(fluorosulphonyl)imide salt in a solvent.

Another subject-matter of the invention is a process for the manufacture of a battery or of a battery cell, comprising the manufacture of an electrolyte as described above and the insertion of this electrolyte between an anode and a cathode.

Another subject-matter of the invention is a bis(sulphonato)imide salt, of formula:

$$(III)\ (SO_3^-)-N^--(SO_3)3C^+ \quad (III)$$

where $C^+$ represents a monovalent cation.

According to one embodiment, $C^+$ represents the $H^+$ ion or the $Na^+$ ion or the $Li^+$ ion or the $Cs^+$ ion or the $K^+$ ion and preferably the $H^+$ ion or the $Na^+$ ion or the $K^+$ ion.

An additional subject-matter of the invention is a bis (chlorosulphonyl)imide compound (salt or acid) of formula (VI). This compound can be isolated before the fluorination stage (b).

The present invention makes it possible to overcome the disadvantages of the state of the art. It more particularly provides a process which makes it possible to obtain LiFSI or NaFSI in a simpler way and/or with a better yield.

This is accomplished by virtue of the development of a process for the preparation of a trisalt of bis(sulphonato) imide and of a cation, comprising the reaction of amidosulphuric acid with a halosulphonic acid with the addition of at least one base which is a salt comprising the abovementioned cation.

This bis(sulphonato)imide trisalt can subsequently be used to prepare bis(fluorosulphonyl)imide, which makes it possible in its turn to obtain LiFSI or NaFSI, this being achieved with a better yield than in the synthetic routes provided in the state of the art.

In comparison with the document WO 2009/123328, the process according to the present invention comprises the isolation of the bis(chlorosulphonyl)imide salt (VI), thus making it possible to remove impurities, such as residual chlorosulphonic derivative, formed during the first stage.

Another subject-matter of the invention is high-purity lithium or sodium bis(fluorosulphonyl)imide.

DESCRIPTION OF EMBODIMENTS OF THE INVENTION

The invention is now described in more detail and without implied limitation in the description which follows:

The invention provides for the preparation of the lithium bis(fluorosulphonyl)imide salt according to the following general scheme in three parts:
1) $(OH)-SO_2-NH_2+(OH)-SO_2-X \rightarrow (SO_3^-)-N^- (SO_3^-)3C^+$
2) $(SO_3^-)-N^--(SO_3^-)3C^+ \rightarrow F-(SO_2)-NH-(SO_2)-F$
3) $F-(SO_2)-NH-(SO_2)-F \rightarrow F-(SO_2)-N-(SO_2)-F\ M^+$ 1st Part—Preparation of the bis(sulphonato)imide trisalt Two alternative forms are envisaged for this first part. The first alternative form corresponds to the following reaction scheme:

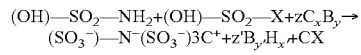

In the preceding scheme, $(OH)-SO_2-NH_2$ is amidosulphuric acid, the formula of which is denoted (I); $(OH)-SO_2-X$ is a halosulphonic acid (X representing a halogen atom), the formula of which is denoted (II); and $C_xB_y$ is a non-nucleophilic base (that is to say, an organic base which is not capable of interfering with the reaction by permanently adding to $(OH)-SO_2-X$), $C^+$ representing the monovalent cation resulting from this base, and x, y, z, x', y' and z' are integral or fractional numbers such that the product zx and the product z'x' are equal to 4.

The formula of the trisalt $(SO_3^-)-N^--(SO_3^-)3C^+$ is denoted (III).

Preferably, X represents chlorine.

$C^+$ represents, for example, the potassium ion K. $C_xB_y$ represents, for example, potassium carbonate $K_2CO_3$. In this case, C represents potassium K, B represents $CO_3$, x has the value 2, y has the value 1, z has the value 2, x' has the value 2, y' has the value 1 and z' has the value 2.

Alternatively, $C^+$ can represent, for example, the sodium ion $Na^+$, the caesium ion $Cs^+$, the lithium ion $Li^+$ or the $H^+$ ion.

The above reaction can, for example, be carried out at a temperature from 0 to 150° C. (preferably from 0 to 50° C., more particularly preferably from 10 to 40° C. and in particular from 15 to 30° C.) and at a pressure ranging from atmospheric pressure up to 15 bar.

Sulfamic acid is preferably the limiting reactant and the halosulphonic acid $(OH)-SO_2-X$ can be used in excess (1 to 3 equivalents).

The second alternative form corresponds to the following reaction scheme:

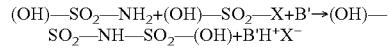

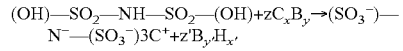

In this scheme, $(OH)-SO_2-NH-SO_2-(OH)$ is bis (sulphonyl)imide, the formula of which is denoted (IV); X still represents a halogen atom; B' is a nucleophilic or non-nucleophilic base; $C_xB_y$ is a nucleophilic or non-nucleophilic base, $C^+$ representing the monovalent cation resulting from this base, and x, y, z, x', y' and z' are integral or fractional numbers such that the product zx and the product z'x' are equal to 3. In the above reaction scheme, the two stages are successive stages and the bis(sulphonyl)imide of formula (IV) is not isolated.

In the case where $C^+$ is a proton $H^+$, the second alternative form comprises only the first stage.

Preferably, X represents chlorine.

$C^+$ represents, for example, the potassium ion K.

$C_xB_y$ represents, for example, potassium hydroxide (KOH), sodium hydroxide (NaOH) or potassium carbonate ($K_2CO_3$).

B' represents, for example, triethylamine ($NEt_2$).

The above reaction scheme can, for example, be carried out at a temperature from 0 to 150° C. (preferably from 0 to 50° C., more particularly preferably from 10 to 40° C. and in particular from 15 to 30° C.) and at a pressure ranging from atmospheric pressure to 15 bar. Sulfamic acid is preferably the limiting reactant and the halosulphonic acid (OH)—$SO_2$—X can be used in excess (1 to 3 equivalents). The base B' is also used as reaction solvent and the base $C_xB_y$ is added in excess until a basic pH from 8 to 14 is obtained.

On conclusion of this first part, the compound (trisalt or acid) of formula (III) is preferably purified. This is because the trisalt (III) or acid is relatively insoluble in water, whereas the impurities formed during the reaction are very soluble in water under basic conditions. The purification can also be carried out from other polar solvents, such as alcohols.

2nd Part—Preparation of Bis (Fluorosulphonyl)Imide Acid

Two alternative forms are envisaged for this second part. The first alternative form comprises a chlorination and then a fluorination, whereas the second alternative form comprises a direct fluorination.

The first alternative form corresponds to the following reaction scheme:

($SO_3^-$)—$N^-$—($SO_3$)3$C^+$ +x$A_1$→Cl—($SO_2$)—$N^-$—($SO_2$)—Cl $C^+$+$A_2$Cl—($SO_2$)—$N^-$—($SO_2$)—Cl $C^+$+3HF→F—($SO_2$)—NH—($SO_2$)—F+2HCl+ CF

In this scheme, F—($SO_2$)—NH—($SO_2$)—F is bis(fluorosulphonyl)imide acid, the formula of which is denoted (V); $A_1$ represents a chlorinating agent; $A_2$ generically represents one or more products from the chlorination reaction; $C^+$ still represents the monovalent cation described above; x is an integral or fractional number; and Cl—($SO_2$)—$NH^-$—($SO_2$)—Cl $C^+$ is a bis(chlorosulphonyl)imide salt, the formula of which is denoted (VI).

$A_1$ can, for example, be thionyl chloride $SOCl_2$ (x=1), in which case $A_2$ represents 2KCl+2$SO_2$, if $C^+$ is the potassium ion.

$A_1$ can also be phosphorus pentachloride ($PCl_5$), phosphorus oxychloride ($POCl_3$) or oxalyl chloride.

The chlorination reaction can, for example, be carried out at a temperature from 0 to 150° C. and at a pressure ranging from atmospheric pressure up to 15 bar. The chlorinating agent is preferably used in excess and generally acts as solvent. The temperature of the reaction is advantageously in the vicinity of the boiling point of the solvent. For example, in the case of thionyl chloride, the boiling point is in the vicinity of 76° C. and the temperature of the reaction will thus, for example, be from 60 to 90° C. or from 70 to 80° C.

As regards the fluorination reaction proper, the latter can, for example, be carried out at a temperature from 0 to 350° C. (preferably from 0 to 50° C., more particularly preferably from 10 to 40° C. and in particular from 15 to 30° C.) and at a pressure ranging from atmospheric pressure to 15 bar.

It is also possible to use other fluorinating agents in place of HF, such as diethylaminosulphur trifluoride (DAST) or sulphur tetrafluoride ($SF_4$), or alternatively fluoride salts of formula $C_xF_y$, where x and y are positive integers and C is a cation. For example, $C_xF_y$ can be zinc fluoride $ZnF_2$, as described in the document WO 2009/123328.

The second alternative form corresponds, for example, to the following reaction scheme:

($SO_3^-$)—$N^-$—($SO_3$)3$C^+$+5HF→F—($SO_2$)—NH— ($SO_2$)—F+2$H_2$O+3CF

In this scheme, $C^+$ still represents the monovalent cation described above, for example $K^+$.

The reaction can, for example, be carried out at a temperature from 0 to 350° C. (preferably from 0 to 50° C., more particularly preferably from 10 to 40° C. and in particular from 15 to 30° C.) and at a pressure ranging from atmospheric pressure up to 15 bar. The hydrogen fluoride is generally used in excess. The reaction is carried out without solvent.

It is possible to use, in place of hydrogen fluoride, other fluorinating agents, such as diethylaminosulphur trifluoride (DAST) or sulphur tetrafluoride ($SF_4$).

As such fluorinating agents are more reactive than hydrogen fluoride, they can be used in a smaller excess than hydrogen fluoride, within the same pressure and temperature ranges.

The bis(fluorosulphonyl)imide acid is subsequently purified; at the end of the reaction, the acid is extracted from the residual solid using an organic solvent as the impurities are not soluble or are only slightly soluble in organic solvents. This organic solvent is preferably dimethyl carbonate.

3rd Part—Preparation of the MFSI

This third part corresponds to the following reaction scheme:

F—($SO_2$)—NH—($SO_2$)—F+MB→F—($SO_2$)—$N^-$— ($SO_2$)—F $M^+$+BH F—($SO_2$)—N—($SO_2$)—F $M^+$ is LiFSI or NaFSI, the formula of which is denoted (VII). MB is a lithium or sodium base, that is to say a base in the form of a salt formed from the lithium cation $Li^+$ or sodium cation $Na^+$ and from an anion $B^-$. This base can, for example, be lithium hydroxide, sodium hydroxide, lithium carbonate or sodium carbonate.

The reaction can, for example, be carried out at a temperature from 25° C. to 80° C. The lithium or sodium base is used in a proportion of 1 to 1.5 equivalents, preferably in water, or also in a polar solvent, such as an alcohol.

According to the present invention, the purity of the lithium or sodium bis(fluorosulphonyl)imide (MFSI) is preferably at least equal to 99.5% by weight, advantageously at least equal to 99.9% by weight.

The impurities, such as LiCl, LiF and $FSO_3Li$ or NaCl, NaF and $FSO_3Na$, present in the bis(sulphonato)imide salt each preferably represent at most 1000 ppm and advantageously at most 500 ppm.

Whatever the method of preparation, $FSO_3Li$ preferably represents at most 5 ppm.

According to any embodiment of the present invention, the lithium or sodium bis(fluorosulphonyl)imide (MFSI) preferably do neither contain moisture nor impurities consisting of salts from a cation of group 11 to 15 and period 4 to 6 of the Periodic Table (such as Zn, Cu, Sn, Pb, Bi). Due to their electrochemical activity, these impurities have a negative effect on the capacity of the Li or Na-ion battery.

Preparation of an Electrolyte

The MFSI prepared as described above can be used in the preparation of an electrolyte by dissolving it in an appropriate solvent.

For example, as is described in the document *J. Electrochemical Society*, 2011, 158, A74-82, the LiFSI can be dissolved at a concentration of 1 mol/l in a 5:2:3 by volume mixture of ethylene carbonate (EC), dimethyl carbonate (DMC) and ethyl methyl carbonate (EMC); such an electrolyte exhibits a very good conductivity, a good cycling stability and a corrosion of the aluminium above 4.2 V.

This electrolyte can subsequently be used in the manufacture of batteries or battery cells by positioning it between a cathode and an anode, in a way known per se.

EXAMPLES

The following examples illustrate the invention without limiting it.

Example 1

Synthesis of Potassium Bis(Sulphonato)Imide Trisalt

The reaction is carried out without solvent in a dry round-bottomed glass flask. 1.1 ml of chlorosulphonic acid are added to 1.61 g of sulfamic acid with stirring. Subsequently, 2 ml of triethylamine are added. The reaction mixture is left stirring for 1 day. The reaction is halted by the addition of 20 ml of water. Subsequently, 2.79 g of potassium hydroxide are added. The final product precipitates and is recovered by filtration and washed with 2×30 ml of $CH_2Cl_2$.

Example 2

Synthesis of Potassium Bis(Chloro-Sulphonyl)Imide 15.3 g of the trisalt are added to a 250 ml round-bottomed flask. 60 ml of oxalyl chloride are subsequently added dropwise, followed by 1 ml of dimethylformamide. The reaction medium is stirred at reflux for 3 hours and the solution becomes yellow in colour. At the end of the reaction, the solution is filtered and a white solid (w=19.0 g) is obtained which comprises the chlorinated compound and potassium chloride.

Example 3

Synthesis of Bis(Fluorosulphonyl)Imide 19.0 g of the mixture of potassium bis(chloro-sulphonyl) imide and potassium chloride are added to a 800 ml autoclave. 20 g of hydrogen fluoride are subsequently added at ambient temperature. The reaction medium is stirred for 3 hours. The excess hydrogen fluoride and the hydrogen chloride given off are subsequently removed by a stream of air. A solid having a golden yellow colour is then obtained.

The invention claimed is:

1. Lithium bis(fluorosulphonyl)imide with a purity at least equal to 99.5% by weight, and wherein the lithium bis (fluorosulphonyl)imide does not contain moisture, wherein LiCl, LiF and $FSO_3Li$ are each present in the lithium bis(fluorosulphonyl)imide, and wherein the lithium bis(fluorosulphonyl)imide comprises at most 1000 ppm of each of the LiCl, LiF and $FSO_3Li$.

2. The lithium bis(fluorosulphonyl)imide according to claim 1, wherein the lithium bis(fluorosulphonyl)imide does not contain impurities selected from the group consisting of cations of elements of Groups 11-15 of the Periodic Table and cations of elements of Periods 4-6 of the Periodic Table.

3. The lithium bis(fluorosulphonyl)imide according to claim 1, wherein LiCl, LiF and $FSO_3Li$ are each present in the lithium bis(fluorosulphonyl)imide in a range of at most 500 ppm.

4. The lithium bis(fluorosulphonyl)imide according to claim 1, wherein $FSO_3Li$ is present in the lithium bis (fluorosulphonyl)imide in a range of at most 5 ppm.

5. The lithium bis(fluorosulphonyl)imide according to claim 1 with a purity at least equal to 99.9% by weight.

6. Sodium bis(fluorosulphonyl)imide with a purity at least equal to 99.5% by weight, and wherein the sodium bis (fluorosulphonyl)imide does not contain moisture, wherein NaCl, NaF and $FSO_3Na$ are each present in the sodium bis(fluorosulphonyl)imide, and wherein the sodium bis(fluorosulphonyl)imide comprises at most 1000 ppm of each of the NaCl, NaF and $FSO_3Na$.

7. The sodium bis(fluorosulphonyl)imide according to claim 6, wherein the sodium bis(fluorosulphonyl)imide does not contain impurities selected from the group consisting of cations of elements of Groups 11-15 of the Periodic Table and cations of elements of Periods 4-6 of the Periodic Table.

8. The sodium bis(fluorosulphonyl)imide according to claim 6, wherein NaCl, NaF and $FSO_3Na$ are each present in the sodium bis(fluorosulphonyl)imide in a range of at most 500 ppm.

9. The sodium bis(fluorosulphonyl)imide according to claim 6, with a purity at least equal to 99.9% by weight.

* * * * *